US010875422B2

(12) United States Patent
Wada et al.

(10) Patent No.: US 10,875,422 B2
(45) Date of Patent: Dec. 29, 2020

(54) BATTERY PACK, AND BATTERY SYSTEM COMPRISING THE SAME

(71) Applicant: OMRON CORPORATION, Kyoto (JP)

(72) Inventors: Junichi Wada, Tokyo (JP); Hiromasa Takatsuka, Tokyo (JP); Kazuki Kasai, Tokyo (JP)

(73) Assignee: OMRON Corporation, Kyoto (JP)

( * ) Notice: Subject to any disclaimer, the term of this patent is extended or adjusted under 35 U.S.C. 154(b) by 108 days.

(21) Appl. No.: 15/759,000

(22) PCT Filed: Nov. 2, 2016

(86) PCT No.: PCT/JP2016/082607
§ 371 (c)(1),
(2) Date: Mar. 9, 2018

(87) PCT Pub. No.: WO2017/086166
PCT Pub. Date: May 26, 2017

(65) Prior Publication Data
US 2018/0304764 A1    Oct. 25, 2018

(30) Foreign Application Priority Data
Nov. 17, 2015  (JP) .................................. 2015-224386

(51) Int. Cl.
*B60L 58/21*        (2019.01)
*H02J 7/00*         (2006.01)
(Continued)

(52) U.S. Cl.
CPC ............. *B60L 58/21* (2019.02); *B60L 3/0046* (2013.01); *B60L 3/04* (2013.01); *B60L 53/65* (2019.02);
(Continued)

(58) Field of Classification Search
CPC .. B60L 58/21; B60L 3/04; B60L 53/65; B60L 53/80; B60L 3/0046;
(Continued)

(56) References Cited

U.S. PATENT DOCUMENTS 4,412,137 A  *  10/1983  Hansen ............... F02N 11/0866
                                                      307/10.6
6,150,793 A     11/2000  Lesesky et al.
(Continued)

FOREIGN PATENT DOCUMENTS

JP    H10-293874 A    11/1998
JP    2002-291110 A   10/2002
(Continued)

OTHER PUBLICATIONS

The Japanese Office Action dated Oct. 29, 2019 in a counterpart Japanese patent application.
(Continued)

*Primary Examiner* — Russell Frejd
(74) *Attorney, Agent, or Firm* — Metrolex IP Law Group, PLLC

(57) ABSTRACT

A battery pack (10) supplies power to a vehicle (20), and comprises a receiver (11), a signal analyzer (12), and a discharge controller (14). The receiver (11) receives from the vehicle (20) a proper use signal generated by the vehicle (20). The signal analyzer (12) analyzes the proper use signal received by the receiver (11). The discharge controller (14) permits power supply to the vehicle (20) when it has been confirmed, as a result of analysis by the signal analyzer (12), that a proper use signal has been received from the vehicle (20).

7 Claims, 5 Drawing Sheets

(51) Int. Cl.
*H01M 10/42* (2006.01)
*B60L 3/04* (2006.01)
*B60L 53/65* (2019.01)
*B60L 53/80* (2019.01)
*B60L 3/00* (2019.01)
*H01M 10/44* (2006.01)
*H01M 10/48* (2006.01)
*H02J 7/02* (2016.01)
*B62M 6/90* (2010.01)

(52) U.S. Cl.
CPC ............ *B60L 53/80* (2019.02); *H01M 10/42* (2013.01); *H01M 10/44* (2013.01); *H01M 10/48* (2013.01); *H02J 7/00* (2013.01); *H02J 7/02* (2013.01); *B60L 2270/34* (2013.01); *B62M 6/90* (2013.01); *Y02T 10/70* (2013.01)

(58) Field of Classification Search
CPC ........... B60L 2270/34; H02J 7/00; H02J 7/02; H01M 10/42; H01M 10/44; H01M 10/48; Y02T 10/70; Y02T 90/169; Y02T 10/7072; Y02T 90/12; Y02T 90/167; B62M 6/90; Y02E 60/10; Y04S 30/14
See application file for complete search history.

(56) References Cited

U.S. PATENT DOCUMENTS

| | | | |
|---|---|---|---|
| 6,154,006 A | 11/2000 | Hatanaka et al. | |
| 6,429,622 B1 | 8/2002 | Svensson | |
| 8,652,670 B2* | 2/2014 | Uchida | H02J 7/00036 429/90 |
| 9,194,919 B2* | 11/2015 | Uesaka | H02J 7/00038 |
| 2002/0111756 A1* | 8/2002 | Modgil | B60R 25/04 702/63 |
| 2007/0194751 A1* | 8/2007 | Odaohhara | H02J 7/0031 320/112 |
| 2011/0089900 A1* | 4/2011 | Hogari | H01M 10/441 320/118 |
| 2011/0127956 A1 | 6/2011 | Mitsutani | |
| 2012/0049786 A1* | 3/2012 | Kurimoto | H01M 10/4221 320/106 |
| 2012/0101755 A1* | 4/2012 | Hirasawa | G06Q 10/02 702/63 |
| 2012/0116699 A1 | 5/2012 | Haag et al. | |
| 2012/0299545 A1* | 11/2012 | Kuraishi | H02J 2207/40 320/112 |
| 2013/0026972 A1 | 1/2013 | Luke et al. | |
| 2013/0026973 A1 | 1/2013 | Luke et al. | |
| 2013/0149578 A1* | 6/2013 | Uchida | H02J 7/0031 429/90 |
| 2014/0089692 A1 | 3/2014 | Hanafusa | |
| 2014/0217935 A1 | 8/2014 | Matsui et al. | |
| 2014/0222358 A1 | 8/2014 | Morita et al. | |
| 2014/0244193 A1 | 8/2014 | Balasingam et al. | |
| 2014/0244225 A1 | 8/2014 | Balasingam et al. | |
| 2014/0361748 A1 | 12/2014 | Charbiwala et al. | |
| 2014/0379188 A1* | 12/2014 | Uesaka | B60L 50/50 701/22 |
| 2015/0180383 A1 | 6/2015 | Matsumoto | |
| 2016/0079775 A1 | 3/2016 | Su | |
| 2017/0117587 A1* | 4/2017 | Sugeno | G01R 31/392 |
| 2018/0038916 A1 | 2/2018 | Haag et al. | |
| 2018/0205332 A1 | 7/2018 | Matsumoto | |

FOREIGN PATENT DOCUMENTS

| | | | |
|---|---|---|---|
| JP | 2006-92850 A | 4/2006 | |
| JP | 2006-236806 A | 9/2006 | |
| JP | 2007-35479 A | 2/2007 | |
| JP | 2007-194052 A | 8/2007 | |
| JP | 2009-186235 A | 8/2009 | |
| JP | 2011-86469 A | 4/2011 | |
| JP | 2012-125142 A | 6/2012 | |
| JP | 2012-159357 A | 8/2012 | |
| JP | 2012-222945 A | 11/2012 | |
| JP | 2013-25589 A | 2/2013 | |
| JP | 2013-74640 A | 4/2013 | |
| JP | 2014-30320 A | 2/2014 | |
| JP | 2014-54082 A | 3/2014 | |
| JP | 2014-135895 A | 7/2014 | |
| JP | 2014-149280 A | 8/2014 | |
| JP | 2014-169059 A | 9/2014 | |
| JP | 2014-193081 A | 10/2014 | |
| JP | 2015-204149 A | 11/2015 | |
| WO | 2013016570 A1 | 1/2013 | |
| WO | 2017/086167 A1 | 5/2017 | |
| WO | 2017/086171 A1 | 5/2017 | |

OTHER PUBLICATIONS

The extended European search report (EESR) dated Nov. 29, 2018 in a counterpart European patent application.
The extended European search report dated Jul. 11, 2019 in a related European patent application.
The Supplementary European Search Report dated May 23, 2019 in a related European patent application.
An English translation of the International Search Report of PCT/JP2016/082607 dated Dec. 20, 2016.
An English translation of the Written Opinion of PCT/JP2016/082607 dated Dec. 20, 2016.
An English translation of the International Search Report of a related international application PCT/JP2016/082616 dated Jan. 24, 2017.
An English translation of the Written Opinion of a related international application PCT/JP2016/082616 dated Jan. 24, 2017.
An English translation of the International Search Report of a related international application PCT/JP2016/082674 dated Jan. 17, 2017.
An English translation of the Written Opinion of a related international application PCT/JP2016/082674 dated Jan. 17, 2017.
The Japanese Office Action dated Aug. 20, 2019 in a counterpart Japanese patent application.
The Japanese Office Action dated Jan. 28, 2020 in a counterpart Japanese patent application.
The Office Action dated Apr. 14, 2020 in a counterpart Japanese patent application.
The U.S. Office Action dated Jun. 1, 2020 in a related U.S. Appl. No. 15/758,513.
U.S. Office Action dated Oct. 28, 2020 in a related U.S. Appl. No. 15/758,513.

* cited by examiner

BATTERY PACK, AND BATTERY SYSTEM COMPRISING THE SAME

FIELD

The present invention relates to a battery pack that supplies power to a power consumption element, and to a battery system comprising this battery pack.

BACKGROUND

In recent years, a system has been constructed in which a battery pack installed in a vehicle such as an electric motorcycle or an electric bicycle is used and then exchanged at a battery station where charged battery packs are available.

When a battery pack is thus rented out, there is the risk that its electrical power may be used for something other than its intended application (in a vehicle, for example). If this happens, there is a possibility that the predicted service life of the battery pack will be less accurate, or the intended performance can not be guaranteed.

For example, Patent Literature 1 discloses a battery pack in which whether or not power supply is permitted is controlled according to the remaining capacity.

CITATION LIST

Patent Literature

Patent Literature 1: JP-A 2014-054082
Patent Literature 2: JP-A 2012-125142

SUMMARY

However, the following problems are encountered with the conventional battery pack mentioned above.

Specifically, with the battery pack disclosed in the above-mentioned publication, whether the pack is in a state in which power can be supplied, or in a state in which the provision of power can be received, is sensed according to the remaining capacity, but no consideration whatsoever is given to the use of the battery pack for purposes other than its intended application.

It is an object of the present invention to provide a battery pack with which the supply of power for anything other than the intended application can be prevented.

The battery pack pertaining to the first invention is a battery pack for supplying power to a specific power consumption element, comprising a receiver, a signal analyzer, and a discharge controller. The receiver receives from the power consumption element a proper use signal generated in the element. The signal analyzer analyzes the proper use signal received by the receiver. The discharge controller permits power supply to the power consumption element when it has been determined, as a result of analysis by the signal analyzer, that a proper use signal has been received from the specific power consumption element.

Here, for example, in order to prevent power supply for anything other than a specific power consumption element, discharge control is performed so as to permit power supply only when a proper use signal is received from a specific power consumption element.

The power consumption element here includes, for example, an electric motorcycle, an electric bicycle, an electrically assisted bicycle, an electric unicycle, an electric automobile (EV), a PHV (plug-in hybrid vehicle), and other such vehicles, as well as various kinds of electrical products that are powered by exchangeable batteries.

The analysis performed by the signal analyzer includes, for example, analysis as to whether or not a proper use signal is being received from a specific power consumption element. Or, it may include analysis as to whether or not a received signal matches a proper use signal by comparing the received signal with the proper use signal to be received from a specific power consumption element.

This allows power supply to anything other than the intended application to be prevented by detecting in advance the use of power by something other than a specific power consumption element, and controlling so that power supply is not permitted. As a result, this solves problems such as a reduction in how accurately the battery pack service life can be predicted, and also ensures the original performance of the battery pack.

The battery pack according to the second invention is the battery pack according to the first invention, wherein the discharge controller does not supply power to the power consumption element if it is determined, as a result of analysis by the signal analyzer, that a signal other than a proper use signal has been received.

Here, the signal received from the power supply target is compared with a proper use signal to be received from a specific power consumption element, and if it is determined that the signal is something other than a proper use signal, control is performed to halt the supply of power to the power supply target.

Consequently, even if some signal is received from the power supply target, when that signal is something other than a proper use signal, it is possible to prevent power from being accidentally supplied from the battery pack.

The battery pack according to the third invention is the battery pack according to the first invention, wherein the discharge controller does not supply power to the power consumption element if it is determined, as a result of analysis by the signal analyzer, that a proper use signal has not been received by the receiver.

Here, if it is determined that the regular use signal that is supposed to be received from a specific power consumption element has not been received from the power supply target, control is performed so as to halt the supply of power to the power supply target.

Consequently, it is possible to prevent power from being accidentally supplied from the battery pack as long as no proper use signal is received from the power supply target.

The battery pack according to the fourth invention is the battery pack according to any of the first to third inventions, wherein the proper use signal is generated as any of an optical signal, an electrical signal, and a magnetic signal.

Here, any of various kinds of signal, such as optical, electrical, or magnetic, is used as the proper use signal transmitted from the specific power consumption element to the battery pack.

Consequently, it can be easily determined whether or not a proper use signal has been received, and whether or not the signal received from the power supply target matches the proper use signal.

The battery pack according to the fifth invention is the battery pack according to any one of the first to fourth inventions, wherein the proper use signal is generated as a digital signal or an analog signal.

Here, a digital signal or an analog signal is used as the proper use signal transmitted from a specific power consumption element to the battery pack.

Consequently, whether or not a proper use signal has been received, and whether or not the signal received from the power supply target matches the proper use signal, can be easily determined by comparing the waveforms of the signals, etc.

The battery system according to the sixth invention comprises the battery pack according to any of the first to fifth inventions, and a power consumption element having a signal generator for generating the proper use signal to be transmitted to the receiver of the battery pack, and a transmitter for transmitting the proper use signal to the receiver.

Here, a battery system is configured comprising the above-mentioned battery pack and a power consumption element having a signal generator for generating the proper use signal to be transmitted to the receiver of the battery pack, and a transmitter for transmitting the proper use signal to the receiver.

Here, the transmitter on the power consumption element side and the receiver on the battery pack side may be connected by wire or wirelessly.

Consequently, in a state in which the battery pack is connected to a specific power consumption element, the supply of power from the battery pack to something other than the intended application can be prevented by determining whether or not the target of the power supply is the proper usage.

As a result, it is possible to solve problems such as a decrease how accurately the battery pack service life can be predicted, and to ensure the intended performance of the battery pack.

The battery system according to the seventh invention is the battery system according to the sixth invention, wherein the power consumption element is an electric motorcycle or an electric bicycle.

Here, a vehicle such as an electric motorcycle or an electric bicycle is used as the specific power consumption element.

Consequently, the use of the battery pack for something other than the proper usage can be prevented in an electric motorcycle or the like in which a battery pack with a low remaining capacity is swapped for a charged battery pack at a specific battery station, for example.

Effects

With the battery pack of the present invention, the supply of electrical power to something other than the intended application can be prevented.

DETAILED DESCRIPTION

The battery pack according to an embodiment of the present invention, and a battery system comprising this battery pack, will now be described through reference to FIGS. 1 to 5b.

Configuration of Battery System 1

Figure 1:
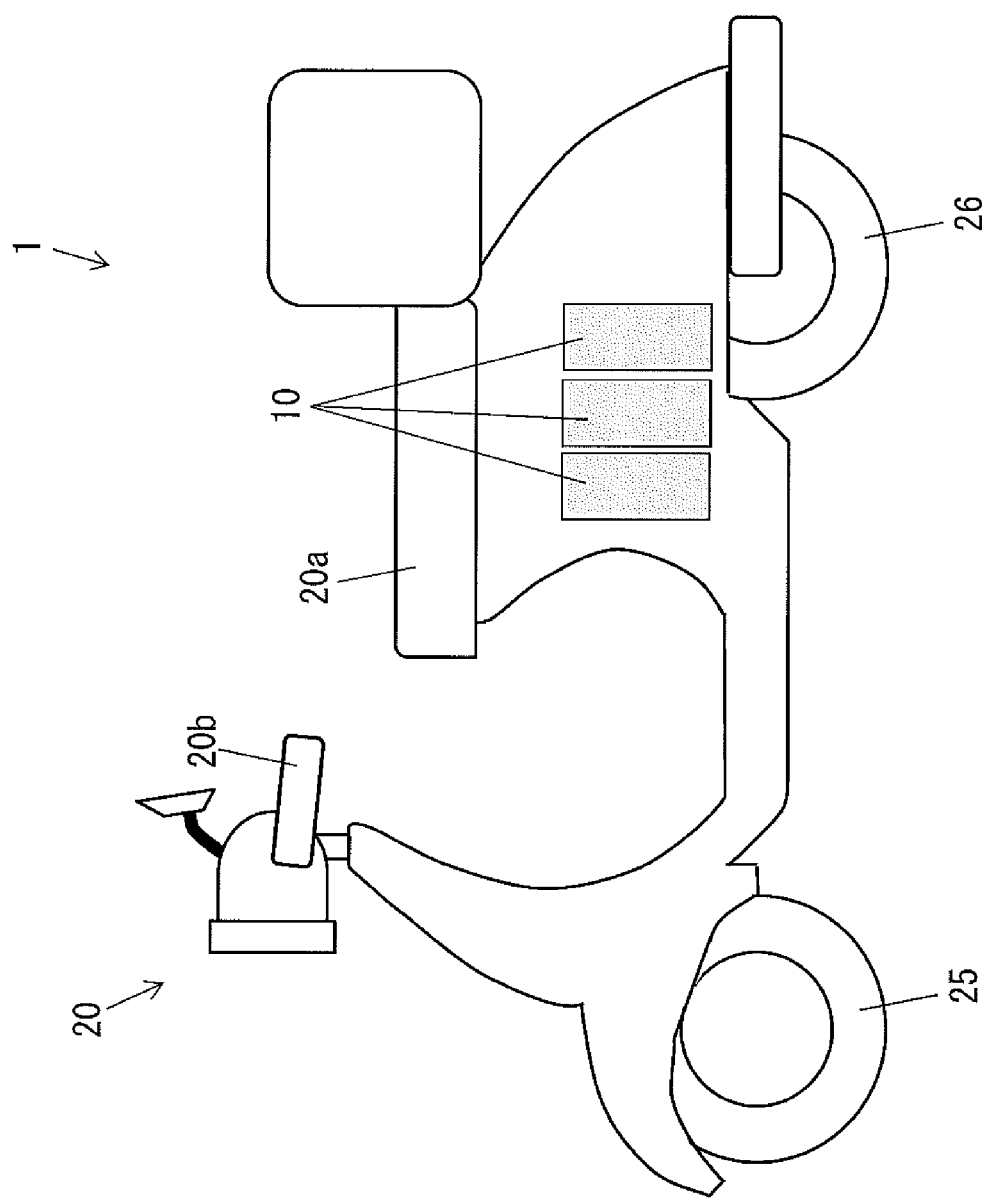
FIG. 1 is a diagram showing the battery pack according to an embodiment of the present invention, and a vehicle (electric motorcycle) in which this battery pack is installed.

The battery system 1 in this embodiment is a system in which power is supplied only to a specific power consumption element (a vehicle 20 in this embodiment), and as shown in FIG. 1, the system comprises a battery pack 10 and the vehicle 20.

As shown in FIG. 1, three battery packs 10 are installed in the vehicle (power consumption element) 20, which is an electric motorcycle or the like.

The vehicle 20 is propelled when power is supplied from the three battery packs 10 installed in a space below a seat 20a, which rotationally drives the rear wheel (drive wheel) 26.

Also, the vehicle 20 can make use of so-called battery swapping, in which battery packs 10 whose remaining capacity has been reduced due to use of the vehicle, spontaneous discharge, or the like are swapped for charged battery packs at a specific battery pack station.

Configuration of Battery Pack 10

Figure 2:
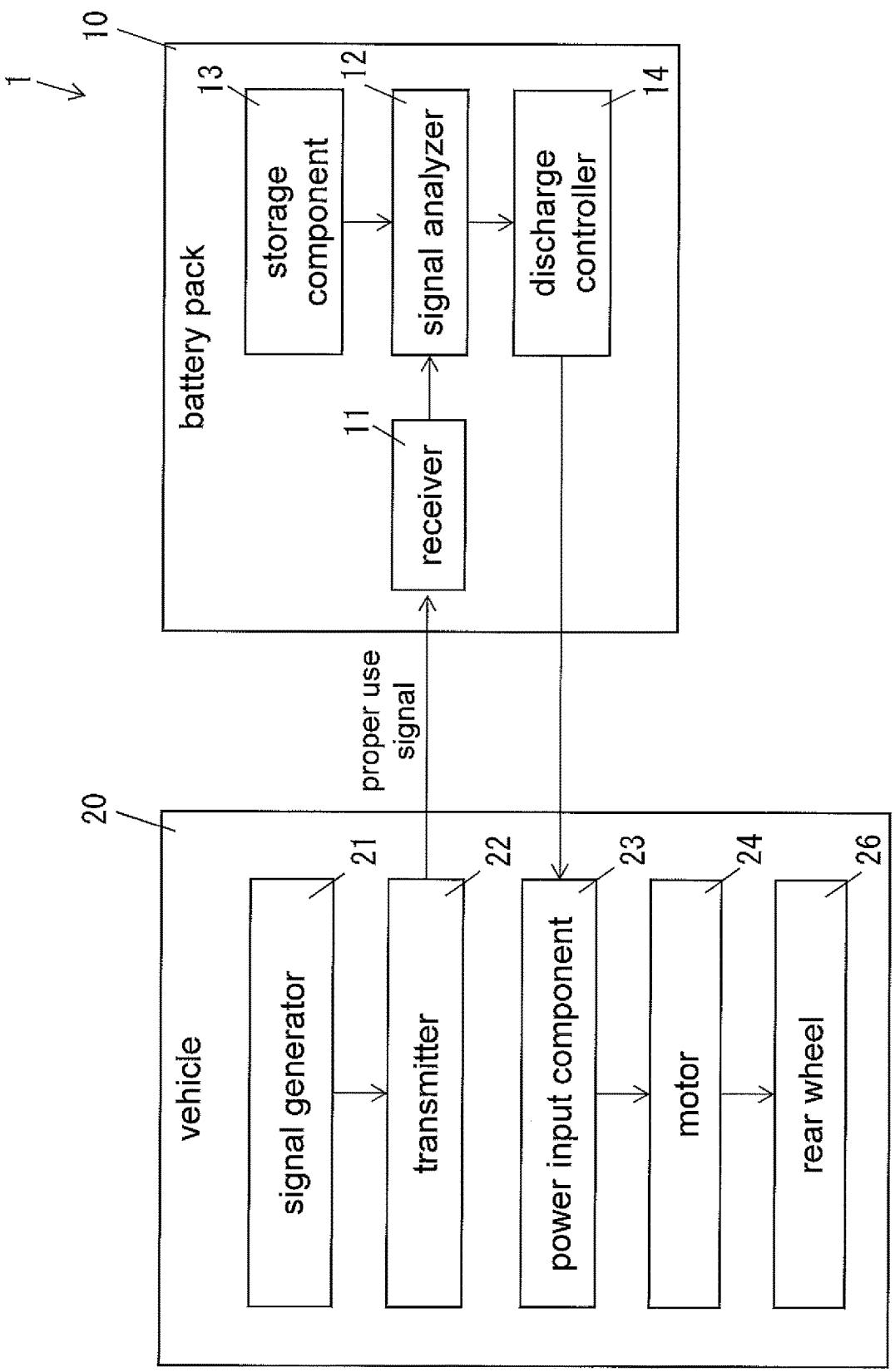
FIG. 2 is a block diagram of the configuration of a battery system including the battery pack and the vehicle in FIG. 1.

Three of the battery packs 10 of this embodiment are installed in the vehicle 20 in a state that allows them to be exchanged, in order to supply power to the vehicle 20. As shown in FIG. 2, a battery pack 10 has a receiver 11, a signal analyzer 12, a storage component 13, and a discharge controller 14.

The receiver 11 is capable of communicating with a transmitter 22 of the vehicle 20, and receives a proper use signal sent from the transmitter 22. Then, when the battery pack 10 is installed in a specific location on the vehicle 20, the receiver 11 is in a state that allows communication with the transmitter 22 on the vehicle 20 side.

The signal analyzer 12 analyzes the proper use signal received from the vehicle 20 side at the receiver 11. More specifically, the signal analyzer 12 analyzes whether or not the signal received by the receiver 11 matches the proper use signal, or whether or not a proper use signal was received by the receiver 11.

Here, the signal analyzer 12 performs analysis by comparing the waveform of the proper use signal received as a digital electric signal with the waveform of the received signal.

That is, the signal analyzer 12 compares the waveform of the signal received by the receiver 11 with the waveform of the proper use signal generated by a signal generator 21 of the vehicle 20 and stored ahead of time in the storage component 13. When the waveform of the received signal matches the waveform of the proper use signal, it is determined that power is being supplied to the vehicle 20, which is the intended application of the battery pack 10.

On the other hand, when the waveform of the received signal does not match the waveform of the proper use signal, this means that a signal other than a proper use signal has been received, and the battery pack 10 is installed in an electrical product other than the specific vehicle 20 that is the intended application. Therefore, in this case it is determined that the battery pack 10 is not being used for the vehicle 20 for which it was intended.

Also, when the receiver 11 cannot receive the proper use signal that it is supposed to receive, this also means that the battery pack 10 is installed in an electrical product other than the specific vehicle 20 for which it was intended. Therefore, in this case it is determined that the battery pack 10 is not being used for the vehicle 20 for which it was intended.

The storage component 13 stores in advance the waveform of the proper use signal generated by the signal generator 21 of the vehicle 20 which is the intended application. Consequently, when a signal is received by the receiver 11, the signal analyzer 12 can read out the waveform of the proper use signal stored in advance from the storage component 13 and compare it with the waveform of the received signal.

The discharge controller 14 determines whether or not discharge to the connected electrical product is permitted, according to the analysis result of the signal analyzer 12.

That is, the discharge controller 14 determines whether or not to permit discharge according to the determination result by the signal analyzer 12 as to whether or not the waveform of the signal received by the receiver 11 matches the waveform of the proper use signal stored in the storage component 13.

More specifically, when the waveform of the received signal matches the waveform of the proper use signal at the signal analyzer 12, it is determined that the battery pack 10 is supplying power to the vehicle 20 for which it was intended. Then, the discharge controller 14 starts power supply to the connected electrical product (in the case of FIG. 2, the vehicle 20).

On the other hand, if it is determined that the battery pack 10 is not being used for the vehicle 20 for which it was intended because the waveform of the received signal does not match the waveform of the proper use signal, the discharge controller 14 halts the supply of power to the connected electrical product.

Also, if it is determined that the battery pack 10 is not being used for the vehicle 20 for which it was intended because the receiver 11 cannot receive a proper use signal, the discharge controller 14 similarly halts the supply of power to the connected electrical product.

The processing for determining whether or not to permit discharge according to whether or not there is a proper use signal will be described in detail below.

Configuration of Vehicle 20

The vehicle 20 is an electric motorcycle that is propelled when supplied with power from the three battery packs 10 installed under the seat 20a, and as shown in FIG. 2, it has the signal generator 21, the transmitter 22, a power input component 23, a motor 24, a front wheel 25, and a rear wheel (drive wheel) 26.

When the battery packs 10 are installed at a specific location in the vehicle 20, the signal generator 21 generates a proper use signal. The signal generator 21 then sends the generated proper use signal to the transmitter 22.

Here, the proper use signal generated by the signal generator 21 is a signal that serves as a condition for receiving the supply of power from the battery packs 10, and is generated as an electric digital signal having a specific waveform 4 (see FIG. 4a, etc.). It is determined whether or not to permit the discharge of the battery packs 10, depending on whether or not a proper use signal has been received from the vehicle 20 side.

The transmitter 22 transmits the proper use signal received from the signal generator 21 to the receiver 11 of the battery packs 10.

The power input component 23 accepts the supply of power from the battery packs 10 by the discharge controller 14 only when a specific condition is met as a result of the determination on the battery pack 10 side.

The motor 24 receives power supply from the battery packs 10 and transmits a rotational drive force to the axle of the rear wheel 26, which is the drive wheel.

The front wheel 25 is a steered wheel provided between the front part of the vehicle 20 and the road surface, and the travel direction can be varied by changing the orientation in conjunction with the orientation of the handle bar 20b.

The rear wheel 26 is a drive wheel provided between the road surface and the rear part of the vehicle 20 where the battery packs 10 are installed, and is rotationally driven by the motor 24.

Flow Up to Discharge Permission in Battery System 1

With the battery system 1 in this embodiment, whether or not power supply (discharge) to the vehicle 20 is permitted from the battery packs 10 is determined by performing communication between the battery packs 10 and the vehicle 20.

Figure 3:
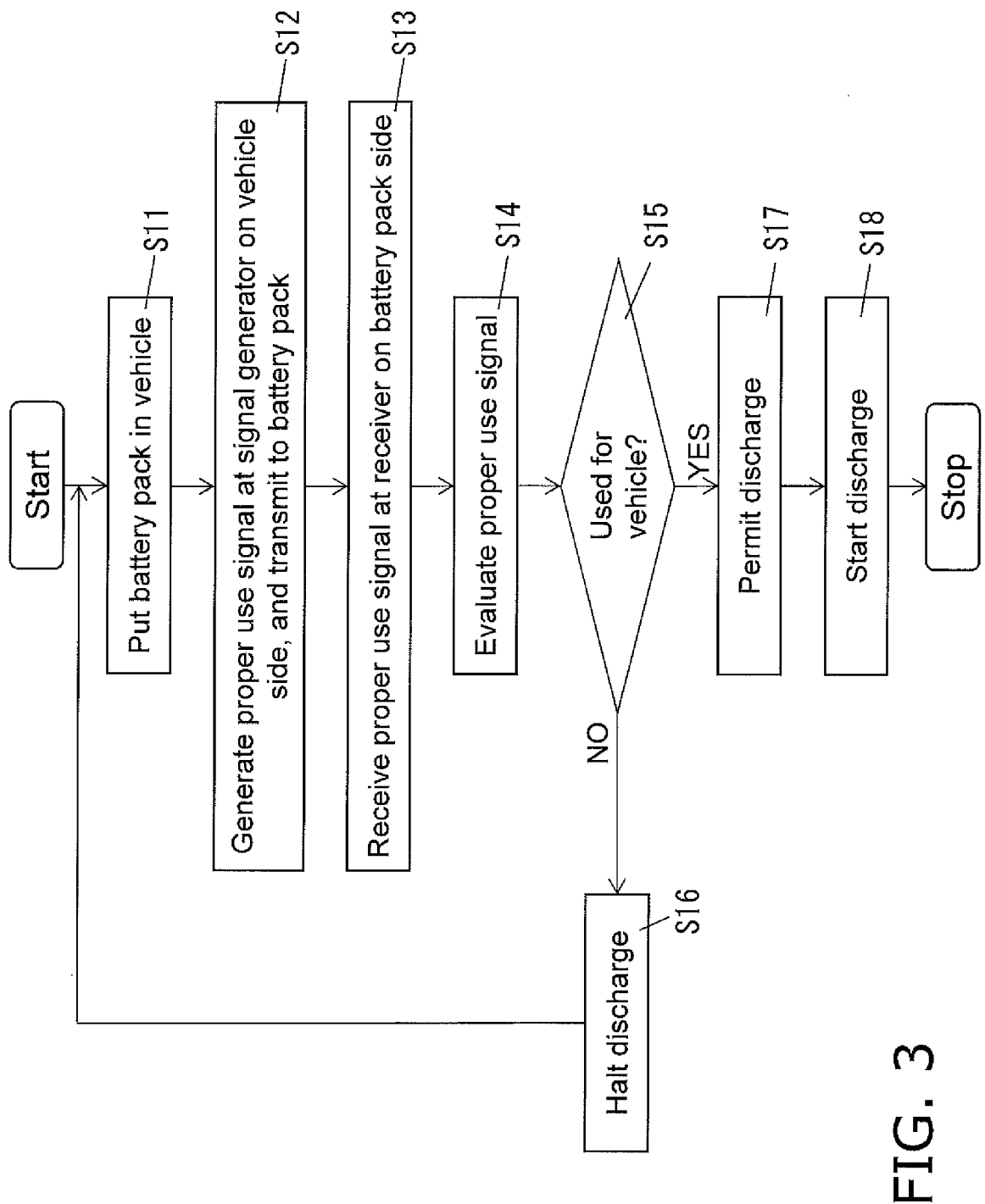
FIG. 3 is a flowchart of the flow up to discharge permission in the battery system in FIG. 2.
Figure 4:
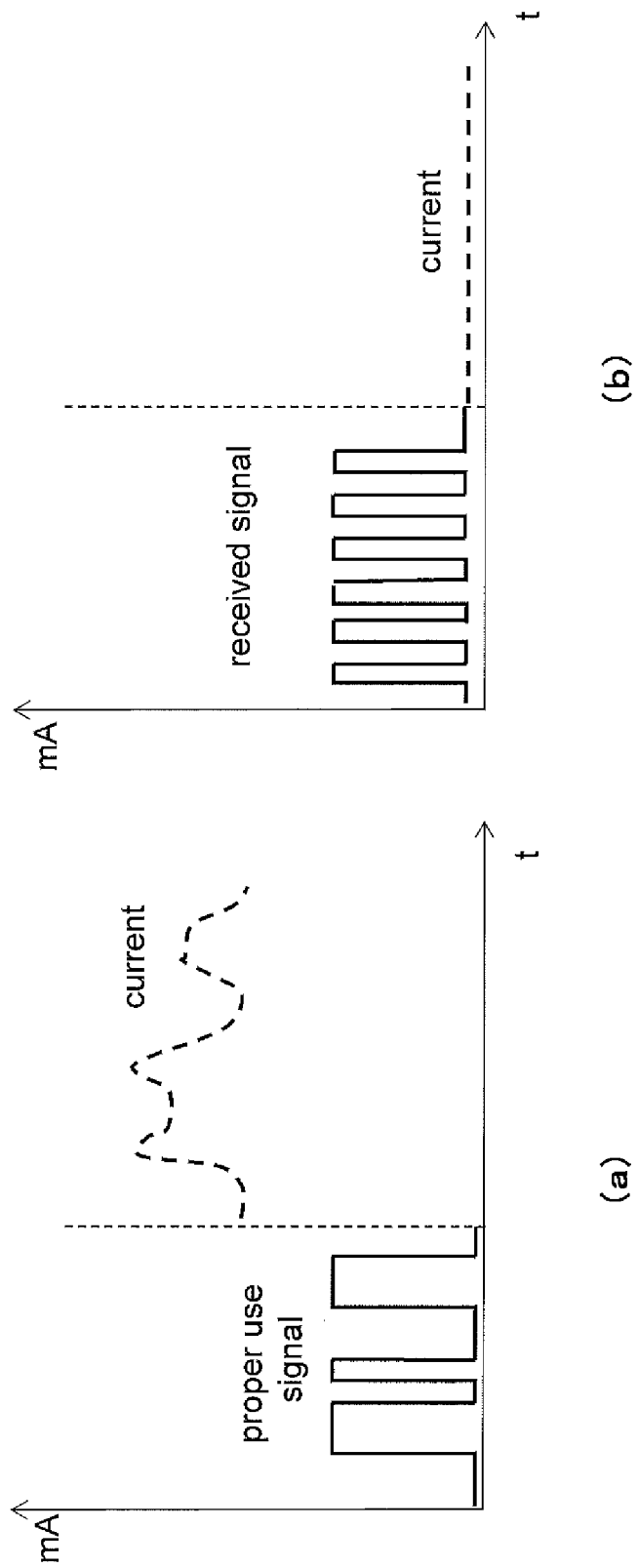
FIG. 4a is a graph of the power (current) supplied by discharge permission when a proper use signal is received.
FIG. 4b is a graph of when discharge is not permitted because the received signal is a signal other than a proper use signal.
Figure 5:
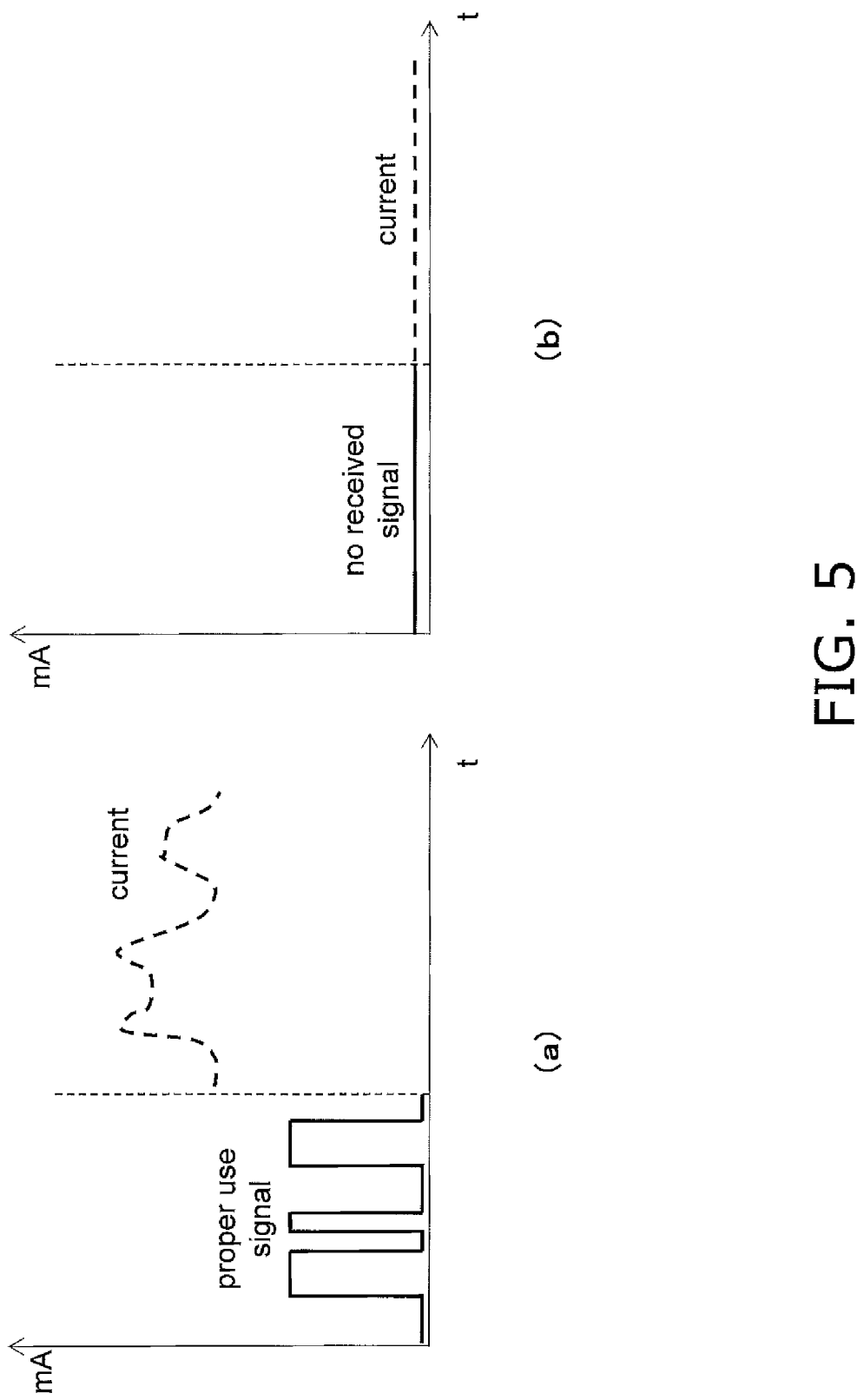
FIG. 5a is a graph of the power (current) supplied by discharge permission when a proper use signal is received.
FIG. 5b is a graph of when discharge is not permitted because a proper use signal could not be received.

More specifically, as shown in FIG. 3, in step S11, first the battery packs 10 are put in a specific location in the vehicle 20.

Next, in step S12, the signal generator 21 on the vehicle 20 side generates an electric digital signal (proper use signal). The proper use signal generated by the signal generator 21 is then transmitted to the battery pack 10 side via the transmitter 22.

Next, in step S13, the receiver 11 on the battery pack 10 side receives the proper use signal.

Next, in step S14, the signal analyzer 12 determines whether a proper usage signal was received by the receiver 11.

More specifically, the signal analyzer 12 determines whether or not the signal received by the receiver 11 is a specific proper use signal. Alternatively, the signal analyzer 12 determines whether or not the receiver 11 has received a proper use signal.

The process of comparing the waveform of the proper use signal with the waveform of the received signal will be described below in detail.

Whether or not the signal received by the receiver 11 is a proper use signal is determined by comparing the waveform of the proper usage signal stored in the storage component 13 of the battery packs 10 with the waveform of the received signal.

Next, in step S15, based on the result of the determination in step S14, the signal analyzer 12 determines whether or not the battery packs 10 are being used for the vehicle 20 for which they were intended.

Specifically, in step S15, when a proper use signal has been received by the receiver 11, the signal analyzer 12 determines that the battery packs are being used for the vehicle 20 for which they were intended, and the flow proceeds to step S17.

On the other hand, if the receiver 11 could not receive a proper use signal, or if a signal other than a proper use signal is received, the signal analyzer 12 determines that the battery packs are not being used for the vehicle 20 for which they were intended, and the flow proceeds to step S16.

Here, in step S16, since it has been determined in step S15 that the battery packs are not being used for the vehicle 20 for which they were intended, the discharge controller 14 decides to halt discharge without permitting power supply (discharge) from the battery packs 10.

On the other hand, in step S17, since it has been determined in step S15 that the battery packs are being used for the vehicle 20 for which they were intended, the discharge controller 14 permits the supply (discharge) of power.

Next, in step S18, the determination in step S17 is received, and power supply (discharge) to the vehicle 20 from the battery pack 10 is commenced.

When Received Signal Differs from Proper Use Signal

With the battery pack 10 in this embodiment, as shown in FIG. 4a, when a proper use signal is received by the receiver 11, discharge to the vehicle 20 is permitted as mentioned above, and power is supplied to the vehicle 20.

FIG. 4a shows an example in which discharge from the battery packs 10 is permitted because the signal received by the receiver 11 is a proper use signal.

That is, in FIG. 4a, when a proper use signal is received by the receiver 11, it is determined whether or not the waveform of the proper use signal (solid line) matches the waveform of the proper use signal stored in the storage component 13. Since it is determined that there is a match, power (current) (dotted line) is supplied to the vehicle 20 as a result of permitting discharge from the battery packs 10.

On the other hand, FIG. 4b shows an example in which discharge from the battery packs 10 is not permitted because the signal received by the receiver 11 is a signal other than a proper use signal.

That is, in FIG. 4b, it is determined whether or not the waveform of the received signal (solid line) matches the waveform of the proper use signal stored in the storage component 13 when a signal has been received by the receiver 11. Since it is determined here that there is no match, the power (current) (dotted line) to the vehicle 20 is halted as a result of the discharge from the battery packs 10 not being permitted.

Consequently, even when the battery pack 10 is used for some application other than the specific vehicle 20, for example, it is possible to prevent the supply of power to something other than the vehicle 20 to which has been transmitted a proper use signal whose signal waveform or the like has been registered in advance to the battery pack 10.

Thus, even if some kind of signal is received by the receiver 11, it is possible to determine whether or not power can be supplied depending on whether or not the waveform of this signal matches the waveform of the proper use signal.

As a result, it is possible to prevent power supply to some application other than what the battery pack 10 was intended for, thereby solving problems such as decreasing the accuracy at which service life of the battery pack can be predicted, and to ensure the original performance of the battery pack.

When Proper Use Signal Cannot be Received

With the battery system 1 in this embodiment, as shown in FIG. 5a, when a proper use signal is received by the receiver 11, discharge to the vehicle 20 is permitted and power is supplied to the vehicle 20, as described above.

The graph in FIG. 5a shows the same details as the graph in FIG. 4a, so it will not be described again here.

On the other hand, FIG. 5b shows an example in which discharge from the battery pack 10 is not permitted because a proper use signal was not received by the receiver 11.

That is, in FIG. 5b, when the battery pack 10 is put in the vehicle 20, no signal at all is received by the receiver 11. Therefore, it is determined here that there is no reception of a proper use signal, so the power (current) (dotted line) to the vehicle 20 is halted as a result of the discharge from the battery pack 10 not being permitted.

Consequently, even when the battery pack 10 is used for some application other than the specific vehicle 20, for example, it is possible to prevent the supply of power to something other than the vehicle 20 to which has been transmitted a proper use signal whose signal waveform or the like has been registered in advance to the battery pack 10.

Thus, even if the battery packs 10 are put in something other than the specific vehicle 20, since the receiver 11 cannot receive a proper use signal, it can be easily determined whether or not power can be supplied.

As a result, it is possible to prevent power supply to some application other than what the battery pack 10 was intended for, thereby solving problems such as decreasing the accuracy at which service life of the battery pack can be predicted, and to ensure the original performance of the battery pack.

Other Embodiments

An embodiment of the present invention was described above, but the present invention is not limited to or by the above embodiment, and various modifications are possible without departing from the gist of the invention.

(A)

In the above embodiment, an example was given in which the signal generator 21 on the vehicle 20 side generated a proper usage signal when the battery packs 10 were put at a specific location in the vehicle 20, but the present invention is not limited to this.

For example, the proper use signal may be generated by the signal generator 21 when a starter switch or the like of the vehicle 20 is operated.

Here again, when the driver of the vehicle 20 or someone else operates the starter switch, a proper use signal having a specific waveform is transmitted from the vehicle 20 side to the battery pack 10 side, and as a result power begins to be supplied from the battery packs 10 to the vehicle 20. This starts up the motor 24 of the vehicle 20, and the vehicle is ready for use.

On the other hand, when the battery packs 10 are used for something other than the intended use, the battery packs 10 cannot receive the proper use signal, or receive a signal different from the proper use signal. Thus, in this case, just as in the above embodiment, power supply from the battery packs 10 to an application other than what was intended will not be performed.

(B)

In the above embodiment, an example was given in which a digital signal was used as the proper use signal that was received in determining whether or not to permit discharge. However, the present invention is not limited to this.

For example, an analog signal may be used as the proper use signal.

(C)

In the above embodiment, an example was given in which an electrical signal was used as the proper use signal that was received in determining whether or not to permit discharge. However, the present invention is not limited to this.

For example, some other signal, such as an optical signal or a magnetic signal, may be used as the proper use signal.

(D)

In the above embodiment, an example was given in which three battery packs 10 were installed in an electric motorcycle (vehicle 20) as a power consumption element. However, the present invention is not limited to this.

For example, one or two battery packs may be installed in the power consumption element, or four or more may be used.

Also, a plurality of battery pack mounting components may be provided on the power consumption element side, and a number of battery packs corresponding to the required electrical capacity may be installed.

Also, an example was given in which the three battery packs 10 installed in the vehicle 20 were configured such that they were disposed under the seat 20a. However, the present invention is not limited to this, and the battery packs may be installed in the vehicle somewhere other than under the seat.

(E)

In the above embodiment, an example was given in which the battery packs 10 supplied power to an electric motorcycle as the power consumption element (vehicle 20). However, the present invention is not limited to this.

For example, in addition to an electric motorcycle, the present invention may also be applied to a battery pack for supplying power to some other vehicle, such as an electric unicycle, an electric bicycle, an electric automobile (EV), or a PHV (plug-in hybrid vehicle).

Alternatively, the power consumption element to which power is supplied from the battery pack of the present invention is not limited to a vehicle, and may instead be some other electrical product driven by a replaceable battery.

(F)

In the above embodiment, an example was given in which whether or not the battery pack is being used properly was determined according to whether or not a proper use signal was received wirelessly by the 11. However, the present invention is not limited to this.

For example, a means may be used for permitting discharge by determining whether or not the use is proper through the use of a signal that is switched on or off by plugging in the battery.

INDUSTRIAL APPLICABILITY

The effect of the battery pack of the present invention is that the supply of power to anything other than the intended application can be prevented, so this invention can be widely applied to various electrical products and the like that are driven by a replaceable battery.

REFERENCE SIGNS LIST 1 battery system
10 battery pack
11 receiver
12 signal analyzer
13 storage component
14 discharge controller
20 vehicle (power consumption element, electric motorcycle)
20a seat
20b handle bar
21 signal generator
22 transmitter
23 power input component
24 motor
25 front wheel
26 rear wheel (drive wheel)
S step

The invention claimed is:

1. A battery pack that supplies power to a vehicle, comprising:
a receiver configured to receive, from the vehicle, a signal generated in the vehicle in response to a starter switch of the vehicle being operated;
a signal analyzer configured to analyze whether the signal received by the receiver is received from the vehicle, or whether a waveform of the received signal matches a waveform of a proper use signal; and
a discharge controller configured to permit power supply to the vehicle in response to determining, as a result of analysis by the signal analyzer, that:
the signal received from the vehicle comprises the proper use signal; or
the waveform of the received signal matches the waveform of the proper use signal.

2. The battery pack according to claim 1,
wherein, in response to determining, as a result of analysis by the signal analyzer, that a signal other than a proper use signal has been received, the discharge controller does not supply power to the vehicle.

3. The battery pack according to claim 1,
wherein, in response to determining, as a result of analysis by the signal analyzer, that the proper use signal has not been received by the receiver, the discharge controller does not supply power to the vehicle.

4. The battery pack according to claim 1,
wherein the proper use signal comprises any of an optical signal, an electrical signal, and a magnetic signal.

5. The battery pack according to claim 1,
wherein the proper use signal comprises a digital signal or an analog signal.

6. A battery system, comprising:
the battery pack according to claim 1; and
a vehicle comprising a signal generator configured to generate the proper use signal to be transmitted to the receiver of the battery pack, and a transmitter configured to transmit the proper use signal to the receiver.

7. The battery system according to claim 6,
wherein the vehicle comprises an electric motorcycle or an electric bicycle.

* * * * *